Oct. 7, 1958  W. C. CHAFFEE ET AL  2,854,870
PRESSURE FLUID OPERATED TOOL WITH CONTROLLED POWER FEED
Filed Dec. 7, 1954  7 Sheets-Sheet 6

INVENTORS.
Walter C. Chaffee
BY Claude L. Robinson
Carlson, Pitzner,
Hubbard & Wolfe
Attys.

United States Patent Office  2,854,870
Patented Oct. 7, 1958

2,854,870

PRESSURE FLUID OPERATED TOOL WITH CONTROLLED POWER FEED

Walter C. Chaffee and Claude L. Robinson, Spring Lake, Mich., assignors, by mesne assignments, to Gardner-Denver Company, a corporation of Delaware Application December 7, 1954, Serial No. 473,662

21 Claims. (Cl. 77—32.7)

The present invention relates generally to pressure fluid operated tools and has particular reference to the control of the movements imparted to the tool's spindle with respect to a workpiece.

It is a general object of the invention to provide, in a tool embodying a power actuated spindle and means for advancing and retracting the spindle, an improved construction and arrangement for controlling both the direction and rate of axial movement of the tool spindle in accordance with the resistance offered thereto by the work.

Another object is to provide control means for automatically adjusting the rate of movement of the tool spindle for effecting rapid approach of the tool spindle toward the work, a forward feeding movement thereof upon engagement of a tool element carried by the spindle with the work, to effect further rapid advance of the spindle after penetration of the work, and then to return the spindle, withdrawing the tool element carried thereby from the work to rest position, in which position operation is stopped.

A further object of the invention is to provide control means responsive both to penetration resistance and to torque resistance encountered by a tool element carried thereby.

A more detailed object of the invention lies in the provision of control means for a tool which is capable first of effecting a rapid approach toward the work; second of effecting forward feeding movement upon engagement with the work by a tool element carried thereby, such feeding movement being automatically adjusted to the resistance offered by the work; third of automatically effecting a retraction of the spindle at a rapid rate so as to withdraw the tool element from the work when substantially increased resistance to rotary movement thereof is encountered; fourth to automatically advance the tool's spindle at rapid approach rate into reengagement with the work to continue operation thereupon; and fifth, upon completion of operation upon the work to return the spindle to rest position.

The objects of the invention thus generally set forth, together with other objects and ancillary advantages are attained by the construction and arrangement shown by way of illustration by the accompanying drawings, in which:

Fig. 8 is a fragmentary horizontal section taken in offset planes substantially as indicated by the line 8—8 in Fig. 5.

While the invention is susceptible of various modifications and alternative constructions, there is shown in the drawings and will herein be described in detail one preferred embodiment. It is to be understood, however, that it is not thereby intended to limit the invention to the specific form disclosed. On the contrary it is intended to cover all modifications and alternative constructions falling within the spirit and scope of the invention as expressed in the appended claims.

Referring more particularly to the drawings, the form of the invention there shown for purposes of illustration is embodied in a tool 20 of the type adapted for operation by pressure fluid such as compressed air. The illustrative tool incorporates a shaft 22 which mounts a chuck 24 for carrying a tool element 25, such for example as a drill. The shaft is reciprocable in a stationary housing. As shown a two-part housing 26 is provided which includes a forward section 27 and a rear section 28. The forward section 27 is of generally tubular form, defining a feed cylinder 29 and a return cylinder 30, the two cylinders being separated by a transverse partition 31. Slidably disposed within the feed cylinder is a feed piston 32 which houses a bearing 34 for the forward end of the chuck shaft 22. Slidably disposed within the return cylinder 30 is a return piston 35. As with the feed piston, the return piston also serves as a housing for an antifriction bearing 36 for the chuck shaft. The two pistons are maintained in rigid spaced relation by means of a rod 38 which extends through the partition 31 that divides the forward housing section into the feed and return cylinders. The feed piston 32, the forward housing section 27, and the partition 31 define a feed piston chamber 39 to which pressure fluid is admitted for advancing the piston assembly and with it the chuck shaft and chuck. Similarly the return piston 35, the forward housing section 27, and the partition 31 define a pressure chamber 40 which may conveniently be called the return piston chamber to which pressure fluid is admitted to retract the piston assembly and thus retract the chuck shaft, the chuck, and a tool element carried thereby.

The rear section 28 of the tool housing serves to contain a drive motor 42 for the tool. The motor 42 as shown is of the rotary vane type adapted for actuation by compressed air. It may conveniently be of the form shown in United States Patent No. 1,940,024 to Ernest H.

Shaft. Thus within its housing 43, the motor 42 includes a rotor 44 which is equipped with extensible vanes 45 and which is eccentrically disposed within a cylinder 46. The rotor 44 is rigid with a rotor shaft 48 the ends of which pass through end plates 49, 50 and are received in antifriction bearings 51. Pressure fluid, such as compressed air, is admitted to the motor 42 by way of a supply passage 52 formed in the motor housing 43 which communicates with a longitudinal air inlet passage 53 which is formed in the cylinder 46 by way of a port 54 in the rear end plate 50. Spent pressure fluid from the motor cylinder is received in an exhaust chamber 55 surrounding the motor cylinder 46 as defined by an enlargement within the motor housing 43. From the exhaust chamber 55 the spent pressure fluid passes through exhaust ports 55a in the motor housing 43 into a muffling chamber 56 adjacent the rear end thereof. The muffling chamber 56 surrounds the motor housing 43, its outer wall being defined by the rear housing section 28. From the muffling chamber 56 spent pressure fluid is exhausted to the atmosphere through one or more exhaust ports 58 conveniently formed in the rear housing section 28 adjacent the forward end of the muffling chamber.

Rigid with the forward end of the rotor shaft 48 is the driving gear 60 of a speed reduction gear train. In the present instance, the speed reduction gear train is of planetary form with the driving gear 60 comprising the sun element thereof. The sun gear meshes with peripherally-spaced planetary gear elements 61 mounted on stub shafts 62 which in turn are supported in a gear cage or spider 64. The planetary gear elements rotate within a fixed ring gear 65. The spider or gear cage 64 is integrally formed with the rear end of a driving spindle 66, which in turn is journaled in an antifriction bearing 68 received in a housing 69. The spindle bearing housing 69 is rigidly secured to the motor housing by a clamping nut 70.

A driving connection between the drive spindle 66 and the chuck shaft 22 is afforded by means of a drive coupling 72. In order to permit advancing and retracting movement of the chuck shaft by the feed and return pistons, the drive coupling 72 is splined to the chuck shaft and is made fast to the drive spindle 66. The latter connection is afforded by means of a through-pin 74 preventing relative axial movement between the drive coupling and the drive spindle, and by lock pins 75 which extend through the rear end of the drive coupling and are received in a keyway 66a formed adjacent the forward end of the drive spindle 66. The lock pins 75, together with the through pin 74, prevent relative rotating movement between the drive coupling and the drive spindle. It will be apparent, therefore, that relative axial movement, by virtue of the splined connection, occurs between the drive coupling and the chuck shaft upon reciprocation of the chuck shaft under the action of the feed and return piston assembly.

Pressure fluid, such as compressed air, is admitted to the instant tool by way of a control valve assembly, indicated generally at 80. The control valve assembly includes a block 81 in the upper portion of which is formed an inlet chamber 82 to which pressure fluid is supplied from any suitable source (not shown) by way of an air line or hose fitting 84. The control valve assembly 80 serves to control the admission of pressure fluid from the inlet chamber 82 to the motor 42 and the admission of pressure fluid to and the exhaust of fluid from the feed and return piston chambers 39 and 40, respectively. The control valve assembly 80 includes a throttle valve 85 and a direction control valve 86. The throttle valve, as shown, is of the rotary spool type and is received in a bore 88 in the valve block 81 which opens into the inlet chamber 82 and communicates with the motor supply passage 52. The throttle valve 85 also serves to control the admission of pressure fluid to the direction control valve 86 from the inlet chamber 82. For this purpose the valve 85 has a passage 89 therein, the rear end of which is adapted, upon suitable rotation of the throttle valve, to open into the inlet chamber 82. The forward end of the valve passage is in continuous communication with the direction control valve 86 by way of an annular chamber 90 defined by the periphery of the forward end of the throttle valve 85 and the bore 88 adjacent the forward end thereof.

The direction control valve 86 is of the two-position, slide type and includes a valving element 91 and an actuator 92 therefor. The actuator 92 comprises a balanced piston and is received in a transverse bore 94 formed in the valve block 81 within which it is axially shiftable. The valve actuator 92 thus includes a pair of pistons 92a and 92b which are maintained in rigid spaced relation by means of a rod 93 to which the valving element 91 is attached. The portion of the bore 94 between the two pistons comprises the main valve chamber 95 to which pressure fluid is supplied from the inlet chamber 82 by way of the throttle valve 85. Fluid pressure is utilized for moving the actuator 92. Thus restricted communication is provided between the main valve chamber 95 and the portions of the bore, or actuator chambers 94a and 94b, respectively, that are disposed outwardly of the pistons 92a and 92b. For this purpose the rod 93 and each of the pistons are provided with restricted orifices 93a and 93b whereby live pressure fluid from the main valve chamber 95 is bled into the actuator chambers 94a and 94b. It will be seen that if one of the chambers is exhausted, pressure fluid in the opposite chamber acting on the piston defining the inner wall thereof will serve to shift the actuator 92 and thus shift the valve element 91 toward the end of the direction control valve bore 94 which was exhausted. Once shifted, the valve will remain in such position until such time as the opposite chamber is exhausted, after there has been sufficient time elapsed for fluid pressure to build up by way of the bleeder orifice 93a or 93b.

Intersecting the direction control valve chamber 95 are three passages 97, 98, and 99, which are arranged in longitudinally spaced relation in the bottom of the chamber 95. These passages 97, 98 and 99, respectively communicate with the advance piston chamber by way of port 97a, the atmosphere, and the return piston chamber by way of port 99a. Thus, the direction control valve serves to connect the advance and return piston chambers 39 and 40 alternatively with the main chamber 95 of the direction control valve so as to supply live pressure fluid thereto, and simultaneously to connect the other one of the chambers to the atmosphere so as to permit exhaust of pressure fluid therefrom.

To regulate the supply of live pressure fluid from the inlet chamber 82 to the motor supply passage 52, the throttle valve 85 has a tapered groove 100 formed therein intermediate its ends and extending partially about it. The position of the motor supply passage 52 in the control valve block 81 intersects the throttle valve bore 88 on the opposite side thereof from the inlet chamber 82. It will be appreciated, therefore, that rotation of the throttle valve 85 causes the tapered throttling groove 100 to move into and out of registry with the upper end of the motor supply passage to provide an opening of increasing or decreasing size so as to meter the live pressure fluid supply to the motor 42 thereby to control its speed of operation.

Although the tool may be connected to a source of pressure fluid and in condition for operation, it is desirable that the motor of the tool not be run until forward movement of the tool is initiated. Therefore, means is provided for interrupting the supply of pressure fluid through the motor supply passage 52 until such time as forward movement of the tool is begun. This permits the tool to be placed in standby or ready condition.

In the present instance the supply of pressure fluid to rotate the motor is under the control of a motor valve 105 which is axially shiftable in a longitudinal bore 106 formed in the upper portion of the rear section 28 of the tool housing. The bore 106 intersects the motor supply passage adjacent the lower end of the portion of the latter that is formed in the valve block 81. The rear end of the motor valve 105 is adapted to seat against an internal annular shoulder 108 formed at the junction of the motor valve bore 106 and the motor supply passage 52.

Figures 1, 13, 14:
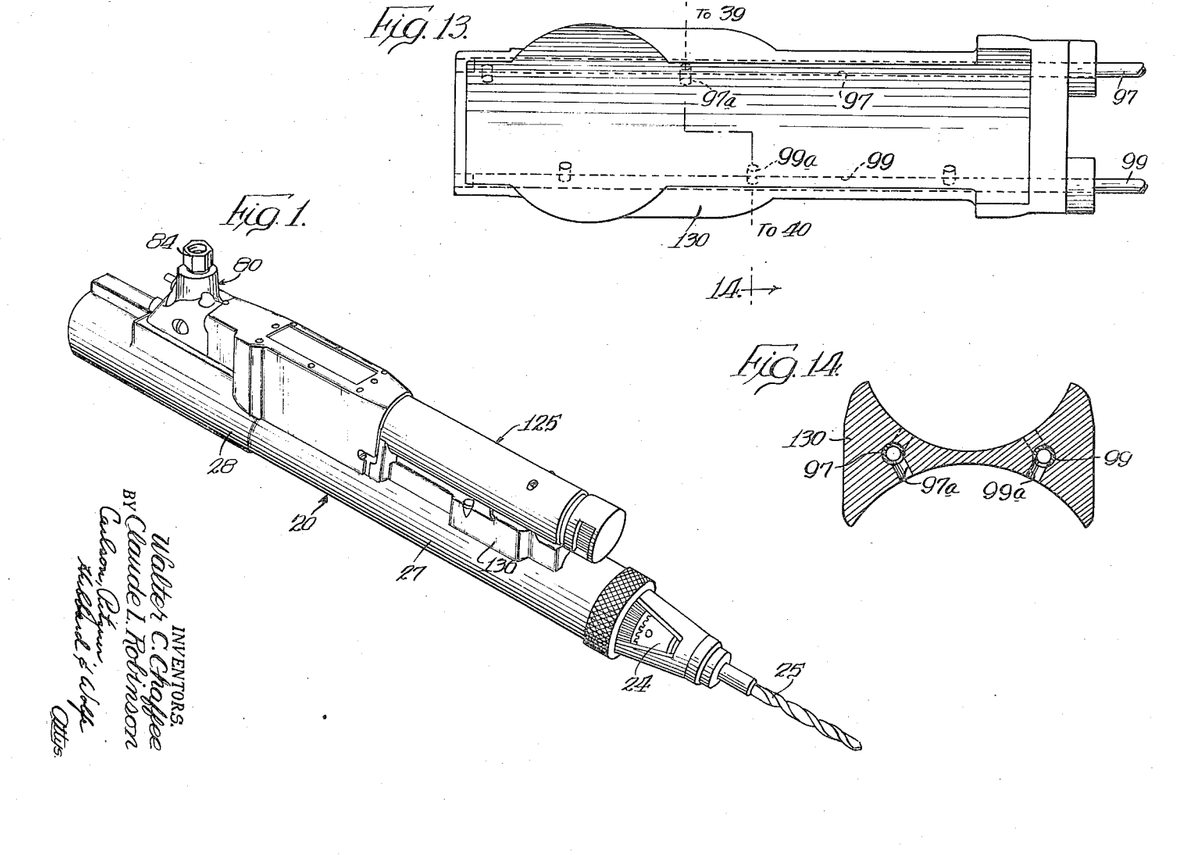
Figure 1 is a perspective view of a tool embodying the features of the present invention.
Fig. 13 is a top plan view of the saddle component of the illustrative tool.
Fig. 14 is a vertical section taken in offset planes substantially as indicated by the line 14—14 in Fig. 13.
Figure 2:
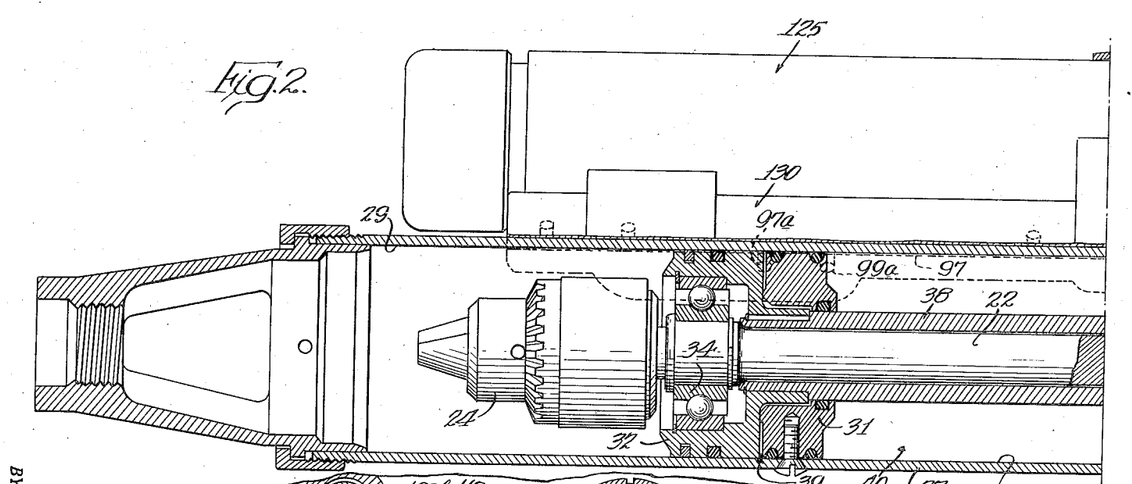
Figs. 2 and 3 are respectively the front and rear portions of a composite central longitudinal section through the tool shown in Fig. 1.
Figure 3:
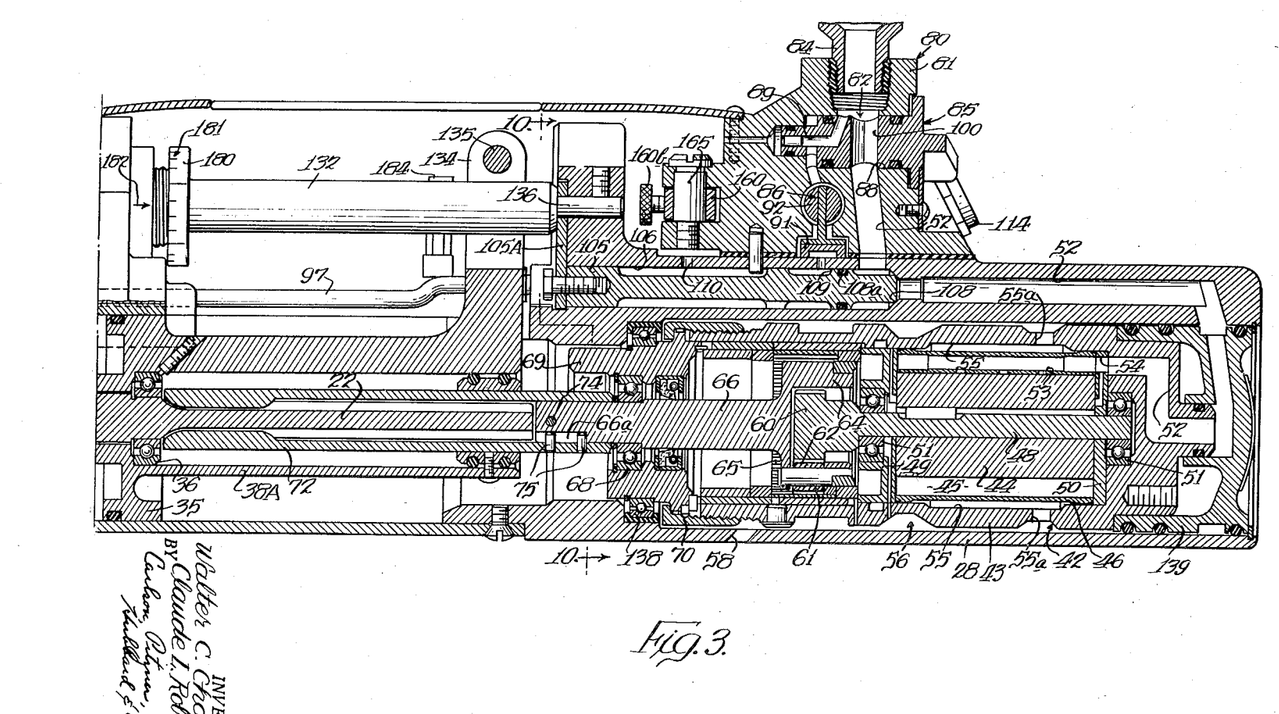
Figures 4, 5:
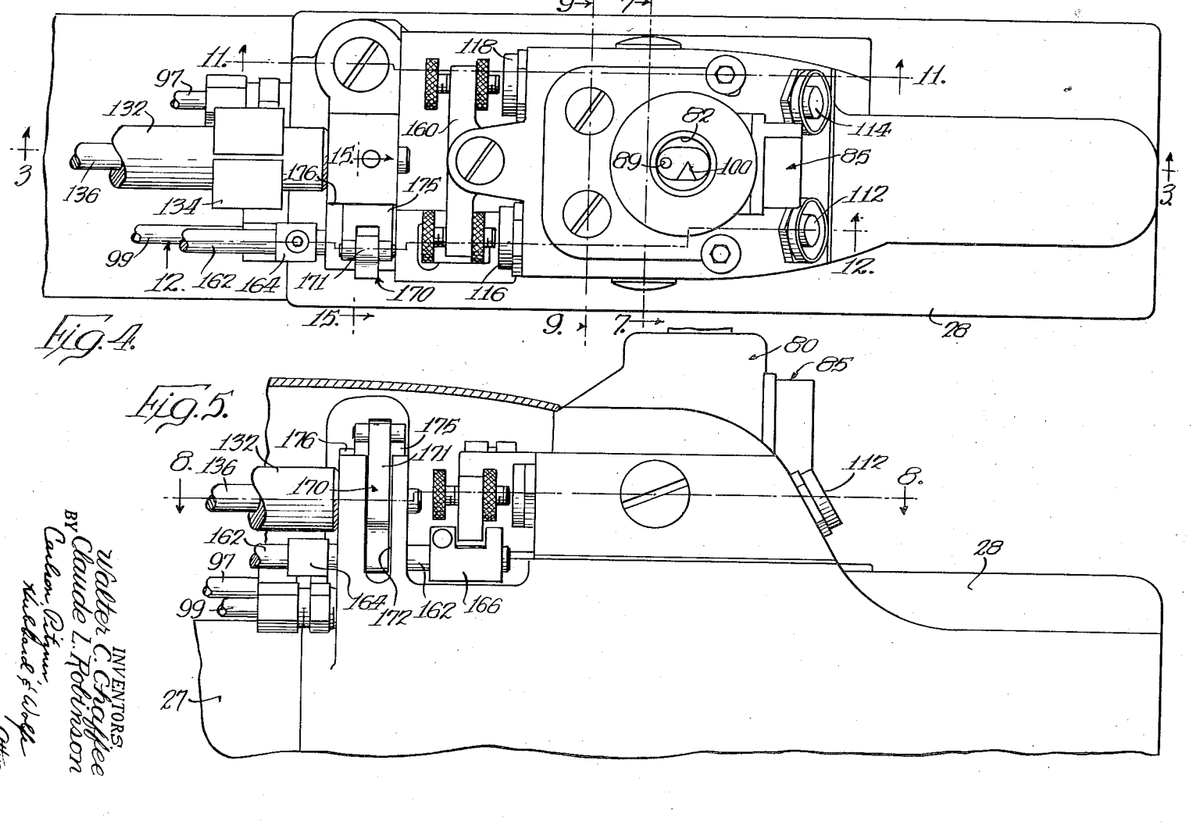
Fig. 4 is a fragmentary top plan view of the rear portion of the illustrative tool.
Fig. 5 is a fragmentary side elevation of the rear portion of the illustrative tool.
Figure 6:
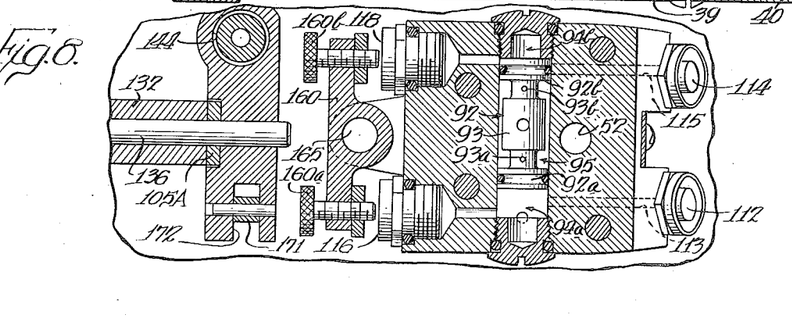
Fig. 6 is a rear end elevation of the illustrative tool.
Figure 7:
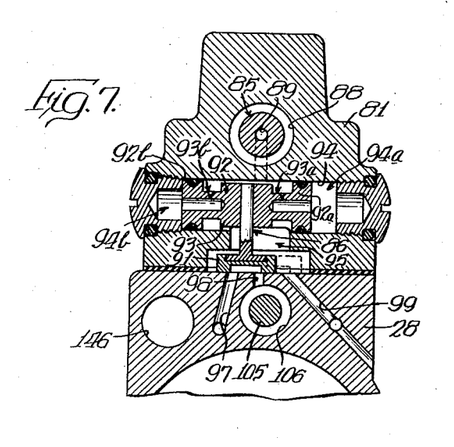
Fig. 7 is a fragmentary vertical section taken substantially in the plane of line 7—7 in Fig. 4.

Upon reference to Fig. 3 of the drawings, it will be seen that the motor valve 105 is provided with an actuator piston 109 which is adjacent to, but spaced from, the rear end thereof. This piston may be conveniently formed by suitably relieving the rodlike member of which the valve 105 is formed intermediate its ends and adjacent its rear end, so as to leave an outwardly extending circumferential shoulder which is suitably grooved for the reception of an O-ring 108a. Upon opening the throttle valve 85 so that live pressure fluid is supplied from the inlet chamber 82 to the upper end of the motor supply passage 52, such pressure fluid acts on the rear face of the motor valve piston 109, tending to move it forwardly in its bore 106 and thus move the motor valve 105 from its seat 108. When this movement of the valve 105 is effected, pressure fluid is admitted through the motor supply passage 52 and thence to the motor 42 to operate the same. In order to prevent hindrance of the movement of the motor valve, the annular space behind the motor valve piston within the motor valve bore is in continuous communication with the atmosphere by way of a port 110. For convenience the central passage 98 of those under the control of the direction control valve 86 opens into the motor valve bore 106 and thus is in continuous communication with the atmosphere by way of the port 110.

In order to shift the direction control valve 86 into one or the other of its positions, means is provided for relieving pressure fluid in the actuator chambers 94a and 94b thereof. As hereinbefore noted, this means serves to exhaust one or the other of these chambers so as to obtain the desired shifting movement of the actuator 92 and thus of the valving element 91 carried thereby. In the present instance this means comprises a plurality of poppet valves respectively communicating with the actuator chambers, so as to permit exhausting of the respective actuator chambers. One such poppet valve is provided for starting the operation of the tool. This poppet valve is disposed as indicated at 112 on the rear side of the control valve block 81. It communicates with the actuator chamber 94a by way of a tortuous passage 113. Disposed on the opposite side of the rear of the valve block 81, as at 114, is what may be termed the "return poppet." The return poppet 114 communicates with the other actuating chamber 94b by way of a tortuous passage 115. Each of the start and return poppets 112 and 114 are arranged for manual operation.

Figure 9:
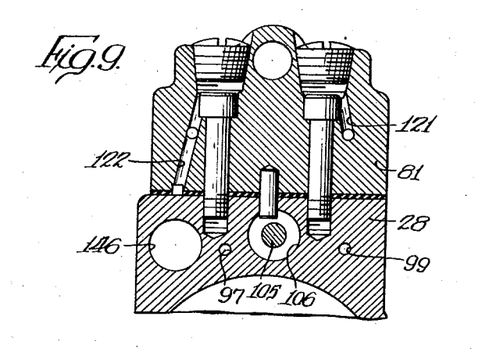
Fig. 9 is a fragmentary vertical section taken substantially in the plane of line 9—9 in Fig. 4.

In addition to these manually operable poppets, the control valve block 81 is provided with other poppet valves arranged to effect a similar shifting of the direction control valve 86, but which are disposed for operation by elements of the tool whereby to effect forward and return movements automatically. Two such poppets are shown at 116 and 118, and they respectively communicate with the actuator chambers 94a and 94b of the direction control valve 86 by way of passages 119 and 120. As shown in Fig. 9 of the drawings, two additional passages 121 and 122 are provided in the control valve block 81, which, though plugged as shown, are suitably formed at their outer ends for reception of air line connections so as to permit of actuation of the direction control valve 86 by means of remotely located poppets. It has been deemed unnecessary to show such remotely located poppets, since the operation of the illustrative tool can be understood from a description of those which have been illustrated. Suffice it to say for present purposes that such remote poppets permit control from a remote station of a single tool or the control of several tools in simultaneous or sequential operation as may be desired.

Upon operation of the start poppet 112 the actuator chamber 94a is exhausted and pressure fluid, built up in the opposite actuator chamber 94b serves to shift the direction control valve 86 to connect the supply passage 99 to the advance piston chamber 39 to the main chamber 95 of the valve 86 and the return piston chamber supply passage 97 to the atmosphere by way of the central exhaust passage 98. With the advance piston chamber supply passage so connected, live pressure fluid is supplied from the main control valve chamber behind the feed piston 32, with the result that the feed piston and the chuck shaft 22, the chuck 24 and a tool element 25 mounted therein are moved toward the work. At the same time the return piston chamber 40 is exhausted as the return piston 35 moves forwardly.

To control the rate of advance of the tool an hydraulic feed control means 125 is provided. The feed control means comprises the subject matter of Patent No. 2,759,458, of Claude L. Robinson. Suffice it to say for present purposes, the hydraulic feed control assembly 125 serves to regulate the rate of movement of the feed and return piston assembly and chuck shaft in accordance with the amount of resistance encountered by a tool element carried by the chuck. It comprises a closed hydraulic system, including two variable volume hydraulic chambers, together with means for regulating the rate of fluid flow therebetween. Variation of the volume of one of the hydraulic chambers is accomplished by means of a piston which is connected to the feed and return piston assembly of the tool. The hydraulic feed control assembly is mounted on a cradle 130 which in turn is carried intermediate the ends of the forward housing section 27 of the tool. The aforementioned piston of the hydraulic feed control assembly 125 has rigid therewith a rod 132 which extends rearwardly from the assembly 125 for connection with the feed and return piston assembly of the tool. Such connection is effected by means of an arm 134 formed integral with a rearward extension 38A of the feed and return piston rod 38 and which extends outwardly therefrom through the forward housing section 27. The outer end of the arm is bifurcated and is provided with a suitable clamping screw 135 by means of which the hydraulic feed control piston rod is gripped.

Upon admission of pressure fluid to the feed piston chamber 39, so as to impart forward motion to the feed piston 32, chuck shaft 22, chuck 24, and a tool element 25 mounted therein, the control arm 134 moves forwardly, thus moving the hydraulic feed control assembly piston forwardly. Longitudinal movement of the piston rod 132 is guided by a stabilizer rod 136, telescopingly received within the rod 132 and fixed to the rear housing section 28. Such forward motion occurs at a rate determined by the setting of the metering means included in the hydraulic feed control assembly 125.

It will be seen in Fig. 3 that the motor valve 105 is equipped with finger 105A which extends upwardly therefrom for engagement by the rear end of the hydraulic feed control assembly piston rod 132. Thus, with the tool in full retracted position, the motor valve 105 is held closed. Upon initiation of forward movement of the tool by the admission of live pressure fluid to the feed piston chamber 39, the feed piston rod 132 is moved forwardly, and the motor valve 105 is released. Therefore, live pressure fluid in the motor supply passage 52 acting on the rear face of the motor valve piston 109 can move the motor valve 105 forwardly and out of engagement with its seat 108. When this occurs live pressure fluid supply to the motor 42 is established through the passage 52 so that rotation thereof obtains to the end that the drive spindle 66, the drive coupling 72, chuck shaft 22, chuck 24, and a tool element 25 mounted in the latter are rotated.

With the advance of the feed and return piston assembly, chuck shaft, chuck and tool, the latter elements are now rotating as set forth above. A tool element 25 carried by the chuck 24 is advanced toward a workpiece. Until engagement of the tool element with the workpiece occurs, such forward axial movement takes place at rapid advance rate. Upon engagement of the tool element with the work, forward movement of the tool is reduced to slow feed rate by the action of the hydraulic feed control assembly 125 as is set forth in detail in the aforementioned copending Robinson application. The actual rate of forward movement is determined in accordance with the amount of resistance to forward movement encountered by the tool element. It will be appreciated that workpieces present various degrees of resistance to the advance of a tool element. Furthermore, different operations are desirably effected at different feed rates. In the case of deep hole drilling, for example, the drill might encounter a hard spot in the material or become clogged with chips, thus hindering its forward motion and making it desirable to withdraw the drill from the work and then reengage the same. The encountering of a hard spot or the clogging of the drill with chips will result in the application to the tool 20 of an increased reaction torque. In accordance with one important feature of the present invention, means is provided for sensing this increased reaction torque and in response thereto for effecting a withdrawal of the tool from the work so as to clear the hole and the tool. Further the invention contemplates the automatic return of the tool to engagement with the work for continuing operation upon it.

Figure 10:
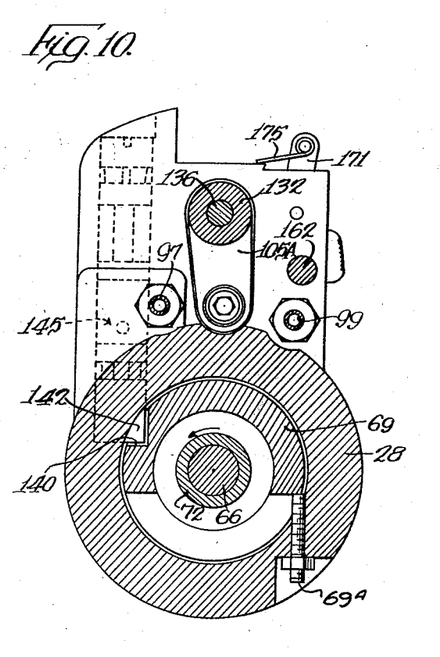
Fig. 10 is a transverse vertical section taken in offset planes substantially as indicated by the line 10—10 in Fig. 3.
Figure 11:
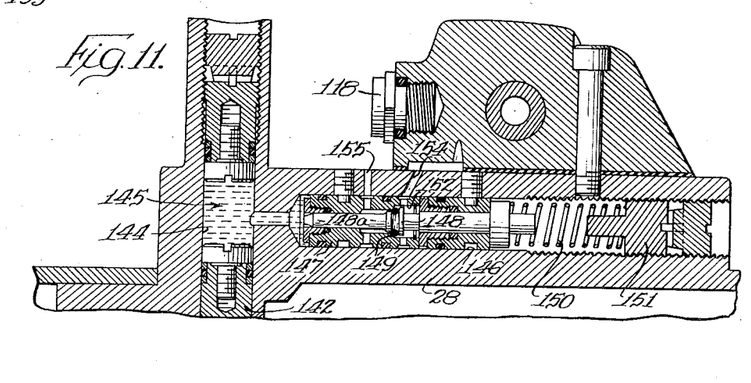
Fig. 11 is a fragmentary vertical section taken in offset planes substantially as indicated by the lines 11—11 in Fig. 4.
Figure 12:
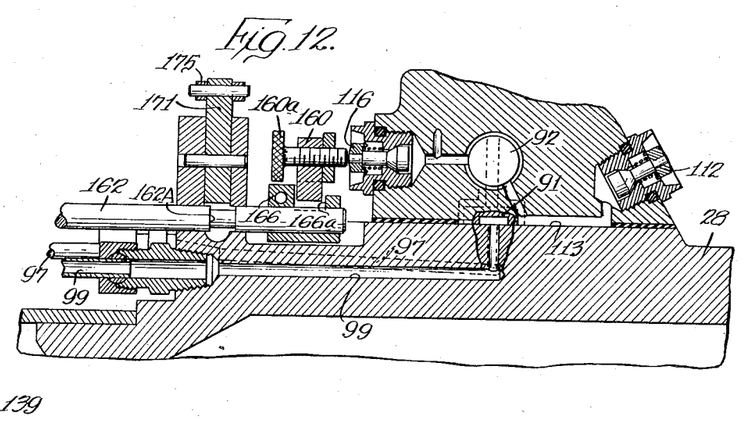
Fig. 12 is a fragmentary vertical section taken in offset planes substantially as indicated by the line 12—12 in Fig. 4.

Referring particularly to Fig. 10, if the drive spindle is being operated in a counterclockwise direction, reaction torque will be applied to the tool in a clockwise direction. In the illustrative tool, the rotary drive unit of the tool, including the motor 42, speed reduction gearing 60—64, and the housing 43, 69, 70 therefor, are mounted for limited angular movement within the rear housing section 28 of the tool 20 in response to the reaction torque whenever the motor lock screw 69A (Fig. 10) is retracted in the housing section 28. For this purpose the drive spindle bearing housing 69 is journaled in an antifriction housing 138, and the rear end of the motor housing 43 is rotatively received in an end cap 139 which is fixed in the rear end of the rear housing section 28. Means is provided for utilizing such movement to operate the direction control valve to the end that the feed and return piston assembly, chuck shaft, chuck, and tool are retracted. As shown, the drive spindle bearing housing 69 is provided in its periphery with a notch 140 for engagement with the lower end of a piston 142. The piston 142 is axially slidable in a generally vertically disposed bore 144 adjacent the forward end of the rear housing section 28 and serves to apply force to a closed body of hydraulic fluid generally indicated at 145. Intersecting the bore 144 is a generally longitudinally disposed bore 146 within which is disposed a poppet valve 148. The poppet valve includes in addition to the valving element 148 a body 147 which is received in the bore 146. The valve body 147 defines a seat 149 adapted to be engaged by the poppet valve 148. The forward portion of the poppet valve body 147 is equipped with suitable sealing means so that the stem portion 148a of the valve 148 serves as a piston. The poppet valve 148 is normally biased into closed position by means of a control spring 150 disposed in the outer end of the bore 146 between the poppet valve and a tension adjusting screw 151. Intermediate the ends of the poppet valve 148, the valve body 147 is relieved as at 152 so as to define a chamber which communicates directly with the actuator chamber 94b of the direction control valve 86 by way of a passage 154. As shown, the enlarged portion of the torque control poppet valve bore is in continuous communication with the atmosphere by way of a vent port 155.

It will be apparent, therefore, that upon exertion of a force on the lower end of the torque piston 142, so as to apply pressure to the hydraulic fluid 145, such pressure is manifested as a force on the forward end of the torque control poppet valve 148. When this force exceeds the force applied to the torque control poppet valve in the opposite direction by the torque control spring, 150 the poppet valve 148 is moved rearwardly out of engagement with its seat 149. Thus communication between the direction control valve actuator chamber 94b and the atmosphere is established by way of the passage 154, the annular poppet valve chamber at 152, and the vent port 155 thereby exhausting the control valve chamber 94b so that live pressure fluid in the opposite actuator chamber 94a of the direction control valve causes the valve 86 to be shifted into return position. Thus the advance piston chamber 39 is connected to the atmosphere and the return piston chamber 40 has live pressure fluid applied thereto. As a result the feed and return piston assembly and with it the chuck shaft 22, chuck 24 and tool element 25, are withdrawn from the work.

It will be appreciated that when this return movement is initiated the reaction torque applied by the work to the tool is relieved. Thus the torque control spring 150 becomes effective to reseat the torque control poppet valve 148, interrupting communication between the torque control poppet valve chamber 94b and the vent port 155. This allows reestablishment of full fluid pressure in the control valve chamber 94b from the chamber 95 by way of the orifice 93b. Further, the closing of the torque control poppet valve 148 by the operation of the torque control spring 150 applies a force to the hydraulic fluid 145. This increased fluid pressure acts on the upper face of the torque piston 142, causing it to be moved downwardly in the bore 144, thereby applying a force to the spindle bearing housing 69 in a counterclockwise direction restoring the latter to a normal position.

The present construction and arrangement also provides for the tool to return to engagement with the workpiece so that operation thereupon proceeds. For this purpose means, including the poppet valve 116, which is adapted to exhaust the direction control valve chamber 94a, is provided so as to reestablish forward movement of the feed and return piston assembly, chuck shaft, and chuck, automatically at the end of the return stroke. In the illustrative tool 20, the poppet valve 116 is disposed on the forward face of the control valve block 81 on the same side thereof as the direction control valve chamber 94a and communicates therewith by way of a passage 156 in the control valve block 81. The poppet valve 116 is arranged for operation by a rocker arm 160, the latter being adapted to be moved by a control rod 162 mounting a stop 164 adapted for engagement by the arm 134 of the feed and return piston rod assembly. More particularly, the rocker arm 160 is pivotally mounted on a pivot pin 165, defining a vertical axis, received in a suitable aperture centrally of the forward portion of the control valve block 81. The control rod 162 extends longitudinally of the tool, parallel to the hydraulic feed control assembly piston rod 132, between the rear housing section 28 and the cradle 130. The control rod 162 is mounted for limited longitudinal shifting movement. Adjacent its rear end the control rod is equipped with a connecting block 166 having a generally U-shaped notch 166a in the upper surface thereof for engagement with the adjacent end of the rocker arm 160.

The stop block 164 is mounted intermediate the rear housing section and the saddle on the control rod 162. The stop block 164 is adapted to be engaged by the arm 132 of the feed and return piston assembly in its return movement. It will be appreciated, therefore, that upon engagement of the stop block 164 by the arm 132, the stop block and with it the control rod 162 and the connecting block 166 are moved rearwardly, thus swinging the rocker arm 160 in a counterclockwise direction (when viewed from above) so as to open the poppet valve 116. This results in the exhausting of the direction control valve chamber 94a so that fluid pressure in the direction control valve chamber 94b causes the direction control valve 86 to be shifted. This reconnects the advance piston chamber 39 to the source of live pressure fluid by way of the direction control valve chamber 95, and the return piston chamber is connected to the atmosphere. The result is, therefore, that upon completion of the return stroke, advance movement of the tool toward the work is begun once again.

In accordance with another aspect of the invention, the tool can be withdrawn from the work, fully retracted and operation of the motor stopped upon completion of the operation upon the workpiece, as for example upon completion of the full forward stroke of the tool. In the illustrative device the control rod 162 is equipped with a forward stop block 168, disposed for engagement by the arm 132 of the feed and return piston assembly during forward movement thereof. Upon reference to Fig. 17, it will be seen that upon engagement of the arm 132 with the forward stop block 168 the control rod is moved forwardly. With it, the connecting block 166 is also moved forwardly so that the rear face of its notch 166a produces rotation of the rocker arm 160 in a clockwise direction (when viewed from above). Adjacent the opposite end of the rocker arm 160 is the poppet valve 118, which is adapted to exhaust the direction control valve chamber 94b to the atmosphere. Upon exhausting the direction control valve chamber 94b, fluid pressure in the opposite chamber 94a causes the direction control valve 86 to shift so as to apply live pressure fluid to the return piston chamber 40 and to cause the feed piston chamber 39 to be exhausted. As a result return movement is initiated.

To prevent reestablishment of forward movement at the end of the return stroke, latch means 170 is provided for holding the control rod 162 in the forward position into which it is moved upon engagement of the feed and return piston assembly arm 132 with the forward stop block 168 as will hereinafter be more fully described. Since rearward movement of the control rod 162 and of the connecting block 166 is thus prevented, the rocker arm 160 is not moved in a counterclockwise direction at the end of the return stroke. As a result, the forward poppet 116 is not opened. Upon completion of the return stroke 132 the rear end of the piston rod of the hydraulic feed control assembly 125 engages the motor valve link 105A. Engagement of the piston rod 132 of the hydraulic feed control assembly 125 with the motor valve link 105A causes the motor valve 105 to be shifted rearwardly in the bore 106 against the action of live pressure fluid on the rear face of the motor valve piston 109, thereby closing the motor valve 105 and interrupting the supply of pressure fluid through the motor supply passage 52 to the motor 42. Thus, upon completion of the return stroke of the feed and return piston assembly 32, 35, 38, the chuck shaft 22 and the chuck 24, operation of the tool is stopped.

Figures 15, 15A, 16, 17:
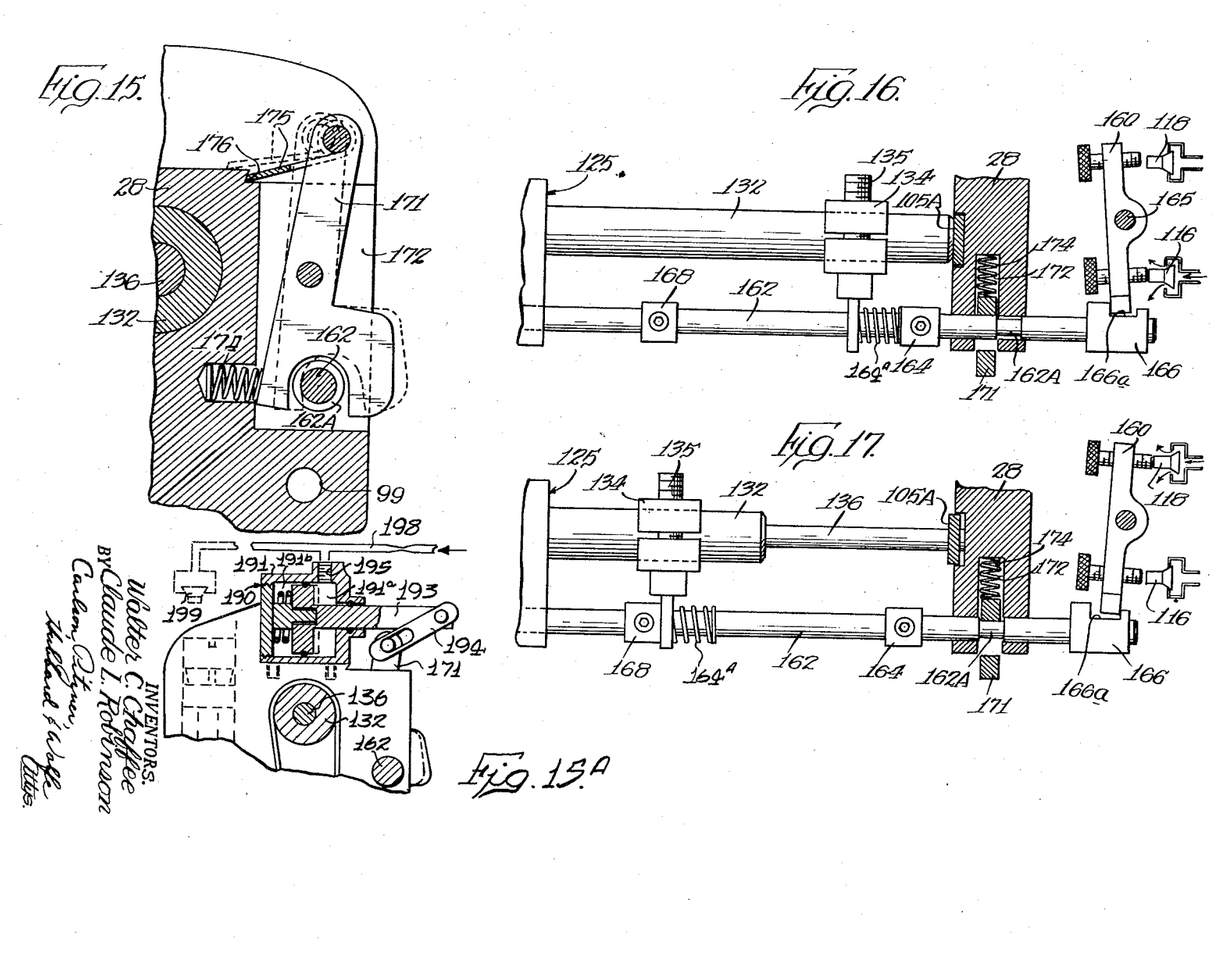
Fig. 15 is a fragmentary vertical section taken substantially in the plane of line 15—15 in Fig. 4.
Fig. 15A is a fragmentary vertical section taken in substantially the same location as Fig. 10 but showing a somewhat modified form of tool embodying the features of the present invention.
Figs. 16 and 17 are diagrammatic views of portions of the control mechanism of the illustrative tool showing different component positions.

The latch means 170, as best shown in Fig. 15, includes a latch lever 171 which is pivoted intermediate its ends in a slot 172 in the forward portion of the rear housing section 38 of the tool 20. The latch lever 171 is of generally h-shape with its depending legs straddling the control rod 162. Adjacent its rear end, but forwardly of the connecting block 166 mounted thereon, the control rod 162 is provided with a peripheral groove 162A so as to provide shoulders extending transaxially of the control rod for engagement with the sides of the legs of the latch lever 171. The latch lever 171 is normally biased by means of a spring 174 so that its legs will engage the control rod groove 162A when the control rod is moved forwardly and the groove is brought into juxtaposition with the latch lever 171. The upper end of the latch lever extends beyond the contiguous portion of the rear housing section 28 to serve as a fingerpiece permitting disengagement of the lower end of the latch lever from the control rod groove 162A. Additionally, the upper end of the latch lever has a finger 175 pivoted thereon which is adapted to engage a notch 176 in the rear housing section 28 so as to hold the latch lever against the action of its biasing spring 174. When the finger 175 engages the notch 176 the legs of the latch 171 are so positioned that the control rod 162 can move freely back and forth and its groove 162A not be engaged if desired.

The present invention contemplates further "peck-drilling" action. Peck-drilling may be defined as operation of a drilling tool in such a manner that the application of a drill to the work occurs for a short time, after which the drill is withdrawn from the work so that the drill and hole are cleared, and subsequently the drill is returned to engagement with the work for another period of drilling operation thereon. This action continues in repeating sequence until a hole of desired depth is completed in the workpiece or the workpiece is penetrated as the case may be. Generally the drill as advanced at a relatively high feed rate during the actual drilling operation, which takes place for a relatively short time as compared to that under ordinary drilling conditions. The time provided for the return and reengagement strokes not only permits clearing of the tool element and the hole but also permits cooling of the tool element.

Peck-drilling operation will be apparent from the foregoing. However, it may be summarized briefly as follows: The instant tool is set in operation by operating the start poppet 112 thereby shifting the direction control valve 86 so that live pressure fluid is supplied to the advance piston chamber 39 and the return piston chamber 40 is connected to the atmosphere. As forward movement of the feed and the return piston assembly begins, the motor valve 105 is permitted to move forwardly under action of live pressure fluid in the passage 52 on the piston 109 so as to supply pressure fluid to operate the motor 42 and rotate the drive spindle 64, chuck shaft 22, chuck 24 and cutting element 25 mounted therein. The cutting element is advanced at rapid traverse rate until engagement thereof with the work obtains, at which time the hydraulic feed control assembly 125 becomes effective to establish feeding movement of the tool and thus of the cutting element at a predetermined feed rate. By properly adjusting the tensioning of the torque control spring 150, taking into consideration the feed rate control adjustment of the hydraulic feed control assembly 125, the tool permits of adjustment so that the torque control means is made to respond to reaction torque encountered as a result of drilling a hole to a depth of two diameters, for example. When this reaction torque obtains, the motor 42 rotates applying the reaction force to the piston 142 and the hydraulic fluid 145 so that the torque control poppet valve 148 opens, causing exhaust of the direction control valve chamber 94b. This results in a shift of the direction control valve into "return position." The tool thus withdraws from engagement with the work.

Upon reaching the limit of its return stroke, the arm 134 of the feed and return piston assembly engages the rear stop block 164, moving the control rod 162, the connecting block 166, and the rocker arm 160 so as to actuate the automatic return poppet 116. As a result the direction control valve 86 is shifted to its feed position and forward movement of the tool is reestablished. This forward movement continues at rapid advance rate until the drill 25 or other tool element engages the work. Thereafter forward movement proceds at slow feed rate under the action of the assembly 125, until the reaction torque again reaches the predetermined value to effect operation of the torque control poppet to reestablish return movement of the tool. This reciprocating action will continue until such time as the feed return piston assembly arm 134 engages the forward stop block 168 to move the control rod 162 forwardly into the position wherein the latch 171 engages the control rod groove 162A, and the rocker arm 169 is moved to operate the return poppet 118. With the control rod 162 in latched condition, the tool 20 returns and stops as previously described. To initiate the next operation, the latch lever 171 is manually operated to release the control rod 162, whereupon the spring 164A urges the rod 162 rearwardly to open poppet valve 116 as in Fig. 16 to again initiate operation of the tool.

In certain applications wherein a tool of the exemplary type is utilized it is desirable to initiate operation of the tool from a remote location. For this purpose the tool can be equipped with a power actuator for the latch means 170 which may be operated to release the latch so as to permit rearward movement of the control rod 162 by the spring 164A to open the poppet 116 (Fig. 16). This, as hereinbefore explained, initiates operation including forward movement of the tool. Such an actuator is shown by way of example in Fig. 15A. As there shown, the exemplary drilling tool is equipped with an actuator 190 which is connected to the upper end of the latch lever 171 for moving the same into and out of position for engagement in the notch 162A of the control rod 162. The actuator 190 includes a cylinder 191 which is divided into two chambers 191a and 191b by a piston 192. The piston 192 is equipped with a rod 193 which extends beyond the cylinder 191 and is connected to the upper end of the control lever 171 by a link 194.

Pressure fluid is admitted to the chamber 191a by way of a port 195 which is adapted to receive a suitable pressure fluid line connection. It will be apparent that upon admission of pressure fluid to the chamber 191a the piston is moved in the cylinder in a direction which tends to pull inwardly on the rod 193 and the connection between the rod and the link 194. The connection between the link 194 and the control lever 171 is of the pin-in-slot type as indicated at 196. It is so arranged that inward movement of the piston rod 193 and the upper end of the link 194 causes the slot to release the pin of the connection 196 thereby permitting the latch lever biasing spring 174 (Fig. 15) to urge the lower end of latch lever outward for engagement with the notch 162A in the control rod 162. A biasing spring 197 is provided in the chamber 191b which is effective to urge the piston outwardly within the cylinder 191. This causes outward movement of the piston rod 193 and its connection with the link 194. As a result the pin-in-slot connection 196 becomes effective to rock the control lever 171 so that the lower end of the lever is moved from engagement in the notch 162A of the control rod 162.

In the illustrative actuator, under normal conditions, a restricted supply of pressure fluid is admitted to the chamber 191a to cause inward movement of the piston 192 and with it the piston rod 193 and the upper end of the link 194 so as to release the lever 171 to the action of the spring 174. To effect outward movement of the piston 192 and rod 193 the chamber 191a is exhausted to permit the biasing spring 197 to act to urge the piston 192, the control rod 193 and the upper end of the link 194 outwardly, and to similarly move the control lever 171.

For illustrative purposes a restricted pressure fluid supply line 198 is diagrammatically shown communicating with the port 195 for continuously supplying pressure fluid to the chamber 191a. To exhaust the chamber 191a the line 198 is shown equipped with a remote poppet valve 199. The poppet 199 vents to the atmosphere and, because of the restricted character of the pressure fluid supply to the chamber, serves to rapidly exhaust the chamber 191a, thereby permitting the spring 197 to force the piston outwardly to release the latch lever 171. When the latch is released the operation of the tool, as noted above, is initiated.

Means is provided for accurately limiting the length of forward movement of the tool so as to permit deep, blind hole drilling to a predetermined depth. For this purpose the forward movement of the tool is positively limited mechanically. In the present instance, this end is conveniently accomplished through the provision of a pair of interengaging stops respectively disposed on the control piston rod 132 of the hydraulic feed control assembly 125 and on the housing of the assembly (Fig. 3). The latter stop comprises a sleeve 180 which may be provided with appropriate graduations 181 on its periphery for coaction with an index mark 182 on the housing of the hydraulic feed control assembly so as to permit of accurate determination of the location of the forward face of the sleeve. Thus the sleeve defines a fixed forward limit stop. For cooperation with the forward limit stop 180, the hydraulic feed control assembly piston rod 132 has mounted thereon a stop block 184. The stop block 184 is made of clamplike form to permit its positioning as desired along the portion of the piston rod 132 between the fixed limit stop 180 and the feed and return piston assembly arm 134. This effects a rough stroke limit adjustment, with fine adjustment being effected by adjustment of the stop sleeves 180. It will be apparent, therefore, that engagement of the two stops 180 and 184 positively limits forward movement of the tool. It is desirable, however, that when such stroke length has been attained by the tool, that return movement be effected so as to withdraw the tool from engagement with a workpiece. This is accomplished by properly adjusting the position of the forward stop block 168 along the control rod 162 so that it is engaged by the arm 134 of the feed and return piston assembly just as the limit stop 184 mounted on the hydraulic feed control assembly piston rod 132 engages the forward limit stop 180.

In order to permit fine adjustment of the limits of both the forward and return strokes of the tool the automatic poppet operating rocker arm 160 is equipped adjacent its ends with thumb screws 160a and 160b, the thumb screws being positioned so that their rear ends engage the poppets 116 and 118 upon rotation of the rocker arm 160.

We claim as our invention:

1. In a pressure fluid operated tool, the combination comprising a rotatable spindle for mounting a tool element, a motor operatively connected with said spindle for rotating the same, pressure fluid operated means for advancing and retracting said spindle, means including a valve having advance and return positions for controlling axial movement of the spindle and tool element with respect to a workpiece, and means responsive to predetermined rotary reaction torque encountered in the advance of the tool element for moving said valve to the return position.

2. In a pressure fluid operated tool of the type having a rotary spindle for mounting a tool element and a motor operatively connected with said spindle for rotating the same, the combination of means for axially moving said spindle, and means for controlling the direction of axial movement of the spindle and tool element with respect to a workpiece, with means responsive to a predetermined amount of rotary reaction torque encountered in the advance of the tool element for operating said direction control means to effect withdrawal of the spindle and tool element from engagement with the work.

3. A power operated tool comprising, in combination, a rotary spindle mounting a tool element for axial movement toward and from the work, a pressure fluid actuator for advancing and retracting the spindle with respect to the work, means governing the operating of said actuator for controlling the direction of spindle movement, and means controlling said direction control means including a valve device and an element shiftable in response to attainment of a predetermined rotary reaction torque on the tool to actuate said valve device to effect operation of said actuator so that said spindle is retracted.

4. In a power operated tool, the combination comprising a rotatable spindle for mounting a tool element, an actuator for advancing and retracting said spindle, and means responsive to rotary reaction torque encountered by the tool element for controlling the operation of the actuator so as to control axial movement of the tool element with respect to a workpiece.

5. In a power operated tool, the combination comprising a spindle for mounting a tool element, a motor operatively connected with said spindle for rotating the same, an actuator for axially moving said spindle, and means including an element shiftable in response to rotary reaction torque encountered during rotary movement of said spindle for controlling operation of said actuator so as to determine the axial direction of movement of the spindle with respect to a workpiece.

6. In a pressure fluid operated tool, the combination comprising a spindle for mounting a tool element, a motor operatively connected with said spindle for rotating the same, an actuator for advancing and returning said spindle, means controlling the direction of operation of said actuator, said motor being mounted for limited rotation in response to reaction torque encountered by the tool for effecting operation of said direction control means to cause said actuator to return said spindle.

7. In a pressure fluid operated tool, the combination comprising a spindle for mounting a tool element, a motor operatively connected with said spindle for rotating the same, an actuator for advancing and returning said spindle, means controlling the direction of operation of said actuator, means responsive to rotary reaction torque encountered by the tool for effecting operation of said direction control means to cause said actuator to return said spindle, and means effective at the end of the return stroke of the spindle for effecting operation of said direction control means to cause said actuator to advance said spindle.

8. In a pressure fluid operated tool, the combination comprising a spindle for mounting a tool element, a motor operatively connected with said spindle for rotating the same, an actuator for advancing and returning said spindle, means controlling the direction of operation of said actuator, said motor being mounted for limited rotation in response to reaction torque encountered by the tool for effecting operation of said direction control means to cause said actuator to return said spindle, and means effective at the end of the return stroke of the spindle for interrupting operation of said actuator and said motor whereby said spindle is stopped in retracted standby condition.

9. A pressure fluid operated tool comprising, in combination, a housing defining feed and return cylinders, a spindle for mounting a tool element and movable longitudinally with respect to said housing, a piston assembly including a feed piston and a return piston respectively disposed within said feed and return cylinders and operatively connected with said spindle for moving the same, a direction control valve having feed and return positions for supplying pressure fluid alternatively to said cylinders, a motor disposed within said housing and operatively connected with said spindle for rotating the same, said motor being mounted within said housing for limited rotation in response to reaction torque encountered by the tool during operation thereof, and means interposed between said motor and said valve responsive to such rotation of said motor for shifting said control valve into return position whereby to cause said piston assembly to withdraw said spindle and a tool element mounted therein from the work.

10. A pressure fluid operated tool comprising, in combination, a housing defining feed and return cylinders, a spindle for mounting a tool element and movable longitudinally with respect to said housing, a piston assembly including a feed piston and a return piston respectively disposed within said feed and return cylinders and operatively connected with said spindle for moving the same, a direction control valve having feed and return positions for supplying pressure fluid alternatively to said cylinders, a motor disposed within said housing and operatively connected with said spindle for rotating the same, said motor being mounted within said housing for limited rotation in response to reaction torque encountered by the tool during rotation thereof, means interposed between said motor and said valve responsive to such rotation of said motor for shifting said control valve into return position to cause said piston assembly to withdraw said spindle and a tool element mounted therein from the work, and means operatively associated with said piston assembly for automatically shifting said control valve to feed position at the end of the return stroke thereof.

11. A pressure fluid operated tool comprising, in combination, a housing defining feed and return cylinders, a spindle for mounting a tool element and movable longitudinally with respect to said housing, a piston assembly including a feed piston and a return piston respectively disposed within said feed and return cylinders and operatively connected with said spindle for moving the same, a direction control valve having feed and return positions for supplying pressure fluid alternatively to said cylinders, a motor disposed within said housing and operatively connected with said spindle for rotating the same, said motor being mounted within said housing for limited rotation in response to reaction torque encountered by the tool during operation thereof, means interposed between said motor and said valve responsive to such rotation of said motor to effect shifting of said control valve into return position to cause said piston assembly to withdraw said spindle and a tool element mounted therein from the work, and means operatively associated with said piston assembly for interrupting the supply of power to said motor at the end of the return stroke of the assembly whereby to stop the operation of the tool in retracted position.

12. A pressure fluid operated tool comprising, in comprising, a housing defining feed and return cylinders, a spindle for mounting a tool element and movable longitudinally with respect to said housing, a piston assembly including a feed piston and a return piston respectively disposed within said feed and return cylinders and operatively connected with said spindle for moving the same, a direction control valve having feed and return positions for supplying pressure fluid alternatively to said cylinders, a motor disposed within said housing and operatively connected with said spindle for rotating the same, said motor being mounted within said housing for limited rotation in response to reaction torque encountered by the tool during operation thereof, means interposed between said motor and said valve responsive to such rotation of said motor to effect shifting of said control valve into return position whereby to cause said piston assembly to withdraw said spindle and a tool element mounted therein from the work, and an operator for said control valve, operable by said piston assembly at the end of the forward stroke thereof for automatically shifting said valve into return position and at the end of said return stroke of the assembly for automatically shifting said valve into forward position.

13. A pressure fluid operated tool comprising, in combination, a housing defining feed and return cylinders, a spindle for mounting a tool element and movable longitudinally with respect to said housing, a piston assembly including a feed piston and a return piston respectively disposed within said feed and return cylinders and operatively connected with said spindle for moving the same, a direction control valve having feed and return positions for supplying pressure fluid alternatively to said cylinders, a motor disposed within said housing and operatively connected with said spindle for rotating the same, said motor being mounted for limited rotation in response to reaction torque encountered by the tool during operation thereof, means interposed between said motor and said valve responsive to such rotation of said motor to effect shifting of said control valve into return position whereby to cause said piston assembly to withdraw said spindle and a tool element mounted therein from the work, an operator for said control valve operatively associated with said piston assembly for shifting said valve into feed position at the end of a return stroke of the assembly after a partial forward stroke thereof, and means for rendering said operator ineffective after completion of a full forward stroke of said assembly to prevent shifting of said valve into feed position after completion of the ensuing return stroke whereby to stop operation of the tool in retracted position.

14. A pressure fluid operated tool comprising, in combination, a housing defining feed and return cylinders, a spindle for mounting a tool element and movable longitudinally with respect to said housing, a piston assembly including a feed piston and a return piston respectively disposed within said feed and return cylinders and operatively connected with said spindle for moving the same, a direction control valve having feed and return positions for supplying pressure fluid alternatively to said cylinders, a motor disposed within said housing and operatively connected with said spindle for rotating the same, said motor being mounted for limited rotation in response to reaction torque encountered by the tool during operation thereof, means interposed between said motor and said valve responsive to such rotation of said motor to effect shifting of said control valve into return position whereby to cause said piston assembly to withdraw said spindle and a tool element mounted therein from the work, an operator for said control valve operatively associated with said piston assembly for shifting said valve into feed position at the end of a return stroke of the assembly after a partial forward stroke thereof, means for rendering said operator ineffective after completion of a full forward stroke of said assembly to prevent shifting of said valve into feed position after completion of the ensuing return stroke whereby to stop operation of the tool in retracted position, and means effective upon completion of said last return stroke to interrupt the supply of power to the tool.

15. A pressure fluid operated tool comprising, in combination, a housing defining feed and return cylinders, a spindle for mounting a tool element and movable longitudinally with respect to said housing, a piston assembly including a feed piston and a return piston respectively disposed within said feed and return cylinders and operatively connected with said spindle for moving the same, a direction control valve having feed and return positions for supplying pressure fluid alternatively to said cylinders, a motor disposed within said housing and operatively connected with said spindle for rotating the same, said motor being mounted for limited rotation in response to reaction torque encountered by the tool and means including a pair of opposed hydraulic pistons one of which is engageable with said motor and the other of which is operatively associated with said valve, said means being responsive to such rotation of said motor to effect shifting of said control valve into return position whereby to cause said piston assembly to withdraw said spindle and a tool element mounted therein from the work.

16. A pressure fluid operated tool comprising, in combination, a housing defining feed and return cylinders, a spindle for mounting a tool element and movable longitudinally with respect to said housing, a piston assembly including a feed piston and a return piston respectively disposed within said feed and return cylinders and operatively connected with said spindle for moving the same, a control valve assembly including a direction control valve having feed and return positions, said direction control valve being adapted to be shifted between feed and return positions by pressure fluid, said control valve assembly also including a plurality of poppet valves operatively connected with said direction control valve to effect shifting of the same between its feed and return positions, a motor disposed within said housing and drivingly connected with said spindle for rotating the same, said motor being mounted for limited rotation in response to reaction torque encountered by the tool during operation thereof, means including one of said poppet valves interposed between said motor and said direction control valve and responsive to rotation of said motor by reaction torque to effect shifting of said direction control valve into return position to cause said piston assembly to retract said spindle, means including another of said poppet valves operable at the end of the return stroke of said piston assembly to automatically effect shifting of said direction control valve into feed position whereby to reestablish forward movement of said piston assembly and spindle.

17. A pressure fluid operated tool comprising, in combination, a housing defining feed and return cylinders, a spindle for mounting a tool element and movable longitudinally with respect to said housing, a piston assembly including a feed piston and a return piston respectively disposed within said feed and return cylinders and operatively connected with said spindle for moving the same, a control valve assembly including a direction control valve having feed and return positions and being adapted to be shifted between its alternative positions by pressure fluid, said control valve assembly also including a plurality of poppet valves operatively connected with said direction control valve to effect shifting of the same between its feed and return positions, a motor disposed within said housing and drivingly connected with said spindle for rotating the same, said motor being mounted for limited rotation in response to reaction torque encountered by the tool during operation thereof, means interposed between said motor and said direction control valve and responsive to rotation of said motor by reaction torque to effect shifting of said direction control valve, said means including a pair of opposed pistons with a body of hydraulic fluid therebetween, one of said poppet valves being connected to one of said pistons, the other of said pistons being engageable with said motor, and a spring biasing said poppet valve into closed position and biasing said other piston by way of said one piston and said hydraulic fluid against said motor to urge the same toward normal position against the action of reaction torque thereon so that predetermined reaction torque on said motor to rotate the same moves said pistons and poppet valve against the action of said spring to shift said direction control valve into return position to cause said piston assembly to retract said spindle.

18. A pressure fluid operated tool comprising, in combination, a housing defining feed and return cylinders, a spindle for mounting a tool element and movable longitudinally with respect to said housing, a piston assembly including a feed piston and a return piston respectively disposed within said feed and return cylinders and operatively connected with said spindle for moving the same, a control valve assembly including a direction control valve and a motor valve, said direction control valve having feed and return positions and being adapted to be shifted between its feed and return positions by pressure fluid, said control valve assembly also including a plurality of poppet valves operatively connected with said direction control valve to effect shifting of the same, a pressure fluid operated motor disposed within said housing and drivingly connected with said spindle for rotating the same, said motor being mounted for limited rotation in response to reaction torque encountered by the tool during operation thereof, said piston assembly being operative when in fully retracted position to hold said motor valve closed to interrupt the supply of pressure fluid to said motor so as to prevent operation thereof, one of said poppet valves being manually operable to effect shifting of said control valve into feed position to initiate forward movement of said piston assembly and spindle, said piston assembly upon forward movement releasing said motor valve to supply pressure fluid to operate said motor, and means including a second one of said poppet valves interposed between said motor and said direction control valve and responsive to rotation of said motor by reaction torque to effect shifting of said direction control valve into return position so as to cause said piston assembly to retract said spindle.

19. A pressure fluid operated tool comprising, in combination, a housing defining feed and return cylinders, a spindle for mounting a tool element and movable longitudinally with respect to said housing, a piston assembly including a feed piston and a return piston respectively disposed within said feed and return cylinders and operatively connected with said spindle for moving the same, a control valve assembly including a direction control valve and a motor valve, said direction control valve having feed and return positions and being adapted to be shifted between its feed and return positions by pressure fluid, said control valve assembly also including a plurality of poppet valves operatively connected with said direction control valve to effect shifting of the same, a pressure fluid operated motor disposed within said housing and drivingly connected with said spindle for rotating the same, said motor being mounted for limited rotation in response to reaction torque encountered by the tool during operation thereof, said piston assembly being operative when in fully retracted position to hold said motor valve closed to interrupt the supply of pressure fluid to said motor so as to prevent operation thereof, one of said poppet valves being manually operable to effect shifting of said control valve into feed position to initiate forward movement of said piston assembly and spindle, said piston assembly upon forward movement thereof releasing said motor valve to supply pressure fluid to operate said motor, means including a second one of said poppet valves interposed between said motor and said direction control valve and responsive to rotation of said motor by reaction torque to effect shifting of said direction control valve into return position so as to cause said piston assembly to retract said spindle, and means including a third one of said poppet valves operatively associated with said piston assembly for shifting said direction control valve into feed position automatically at the end of the return stroke of the piston assembly.

20. A pressure fluid operated tool comprising, in combination, a housing defining feed and return cylinders, a spindle for mounting a tool element and movable longitudinally with respect to said housing, a piston assembly including a feed piston and a return piston respectively disposed within said feed and return cylinders and operatively connected with said spindle for moving the same, a control valve assembly including a direction control valve and a motor valve, said direction control valve having feed and return positions and being adapted to be shifted between its feed and return positions by pressure fluid, said control valve assembly also including a plurality of poppet valves operatively connected with said direction control valve to effect shifting of the same, a pressure fluid operated motor disposed within said housing and drivingly connected with said spindle for rotating the same, said motor being mounted for limited rotation in response to reaction torque encountered by the tool during operation thereof, said piston assembly being operative when in fully retracted position to hold said motor valve closed to interrupt the supply of pressure fluid to said motor so as to prevent operation thereof, one of said poppet valves being manually operable to effect shifting of said control valve into feed position to initiate forward movement of said piston assembly and spindle, said piston assembly upon forward movement thereof releasing said motor valve to supply pressure fluid to operate said motor, means including a second one of said poppet valves interposed between said motor and said direction control valve and responsive to rotation of said motor by reaction torque to effect shifting of said direction control valve into return position so as to cause said piston assembly to retract said spindle, means including a third one of said poppet valves operatively associated with said piston assembly for shifting said direction control valve into feed position automatically at the end of its return stroke, and means including a fourth one of said poppet valves operative upon completion of a full forward stroke of said piston assembly for shifting said direction control valve into return position for withdrawing the tool from the work and operatively associated with said last mentioned means to prevent reinitiation of forward movement of said piston assembly whereby said piston assembly closes said motor valve and said tool is stopped in retracted position.

21. A pressure fluid operated tool comprising, in combination, a housing defining a motor chamber and feed and return cylinders, a spindle for mounting a tool element movable longitudinally with respect to said housing, a piston assembly including a feed piston and a return piston respectively disposed within said feed and return cylinders and operatively connected with said spindle for moving the same, a direction control valve having feed and return positions for supplying pressure fluid alternatively to said cylinders, a motor disposed within said housing chamber and operatively connected with said spindle for rotating the same, means including a valve for supplying pressure fluid to said motor for operating the same to rotate said spindle, means responsive to rotary reaction torque encountered by the tool for effecting operation of said direction control means to cause said piston assembly to return said spindle, and means operative at the limit of the return stroke of said assembly to close said motor supply valve to interrupt the supply of pressure fluid to said motor.

References Cited in the file of this patent

UNITED STATES PATENTS

| 1,911,132 | Macomber | May 23, 1933 |
| 2,454,235 | Tomek | Nov. 16, 1948 |
| 2,488,620 | Evenstad et al. | Nov. 22, 1949 |
| 2,495,917 | Miner | Jan. 31, 1950 |

FOREIGN PATENTS

| 198,473 | Great Britain | June 7, 1923 |